(No Model.)   2 Sheets—Sheet 1.

C. DAVIS.
BOX OR RECEPTACLE FOR ARTISTS' COLORS.

No. 303,495.    Patented Aug. 12, 1884.

*Fig. 4.*   *Fig. 5.*   *Fig. 6.*

Witnesses:    Inventor:
              Charles Davis

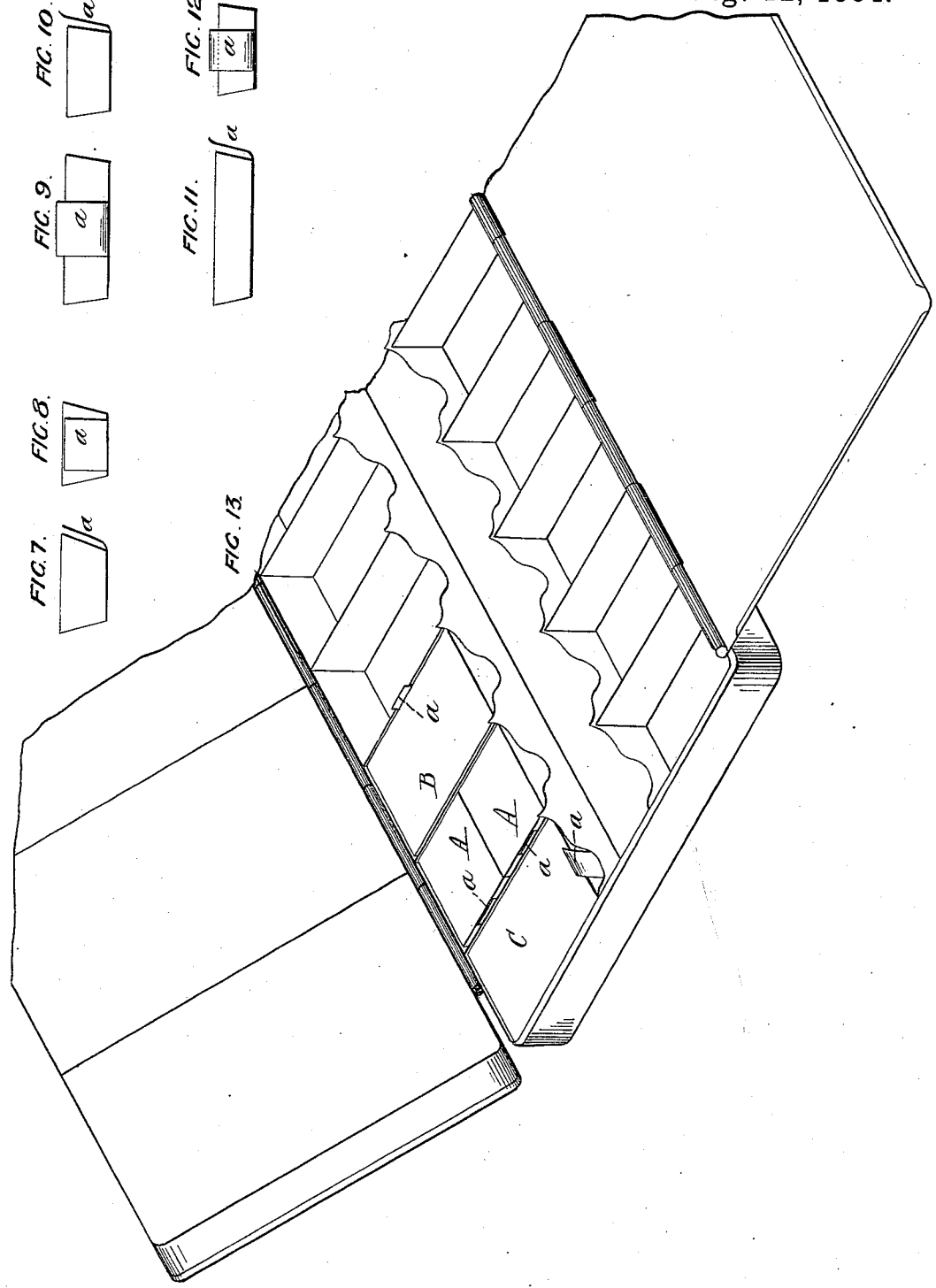

United States Patent Office.

CHARLES DAVIS, OF BLACKFRIARS ROAD, COUNTY OF SURREY, ASSIGNOR TO WINSOR & NEWTON, (LIMITED,) OF RATHBONE PLACE, ENGLAND.

BOX OR RECEPTACLE FOR ARTISTS' COLORS.

SPECIFICATION forming part of Letters Patent No. 303,495, dated August 12, 1884.

Application filed March 26, 1884. (No model.) Patented in England June 13, 1883, No. 2,939, and January 3, 1884, No. 581; in France November 19, 1883, No. 158,646, and in Belgium December 15, 1883, No. 63,357.

*To all whom it may concern:*

Be it known that I, CHARLES DAVIS, of the firm of Davis Brothers, (artist-color-box maker,) a subject of the Queen of Great Britain and Ireland, and residing at No. 24 Webber Street, Blackfriars Road, in the county of Surrey, England, have invented certain Improvements in Boxes or Receptacles for Artists' Colors, (for which I have obtained patents in Great Britain, No. 2,939, dated June 13, 1883, and No. 581, dated January 3, 1884; in France No. 158,646, dated November 19, 1883, and in Belgium No. 63,357, dated December 15, 1883,) of which the following is a specification.

This invention consists in retaining the cakes or pans of color firmly in position within the divisions of the box by the employment of a spring or springs, so as to prevent the said cakes or pans from rattling or moving from their places when the box is reversed. I propose to employ the ordinary form of color-box, with compartments such as are in vogue at the present time, and in each compartment containing the cakes or pans of color I form or attach a spring, of which a series may be made out of one piece and of any suitable metal; but I find that the employment of thin sheet brass is very advantageous for the purpose. On the insertion of the pan or cake the spring is thereby compressed against the division or casing of the box, and the pan or cake is consequently most effectually retained. The lateral partition or partitions may be also shaped as usual, with cut-away portions at their upper parts to allow of the withdrawal of the pan or cake of color. If preferred, the springs may be carried on the pans instead of in the box.

Figure 1:
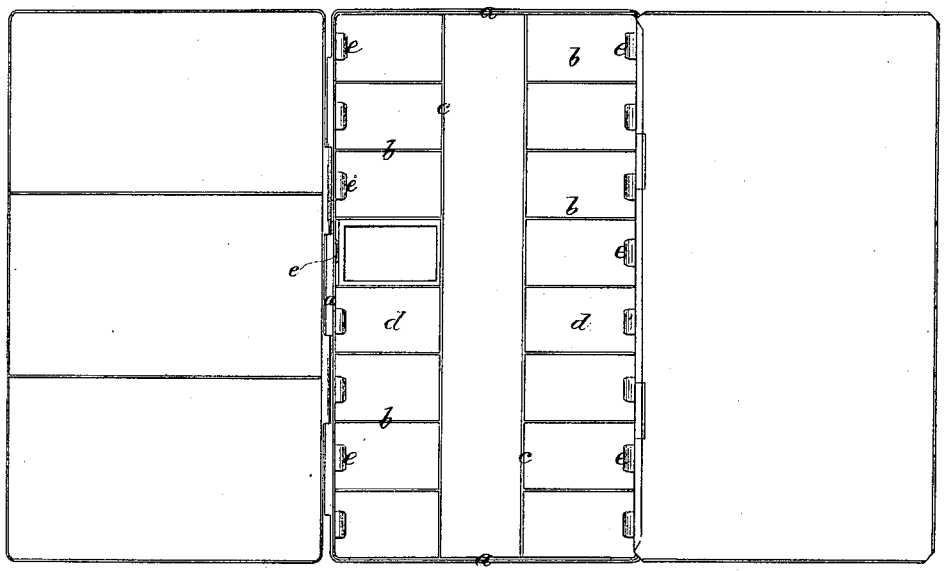
Figure 2:
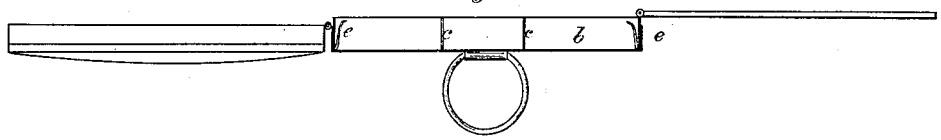
Figure 3:
Figure 3:
Figure 3:
Figure 3:
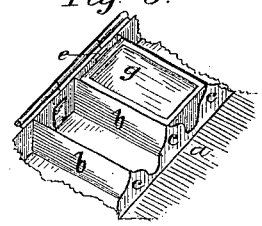

In the drawings, Figure 1 is a plan of an open box constructed in accordance with my invention. Fig. 2 is a transverse section through the same, and Fig. 3 is a longitudinal section showing the lateral partitions in elevation. *a a* is the body of the color-box. *b b* are the transverse partitions, and *c c* the lateral partitions forming the compartments *d d*, in which the springs *e e* are mounted. These springs *e* I have shown in section at Fig. 4 and in part elevation at Fig. 5, which views are drawn to a larger scale. From these figures it will be seen that the springs are formed out of the one piece of metal *f*; but it will be obvious that they may be otherwise attached or formed; but the method I have shown I find most advantageous.

Fig. 6 is a perspective view of part of the box, showing a pan, *g*, (or it may be a cake of color, as before mentioned,) in position in one of the compartments, the adjoining compartment being shown unoccupied to illustrate the normal position of the springs *e*. Although I have shown my form of springs attached to the side of the box, yet it will be obvious that they may be formed out of a base-plate in combination with the lateral and transverse divisions, or they may be carried by the pans instead of the box, and that they are not necessarily in the position shown in the drawings, provided that they are situated in each compartment to effect the hereinbefore-mentioned purpose. It will also be seen from Fig. 3 that the color pans or cakes can be easily inserted or withdrawn without the necessity of prizing them up by a tool, the spaces for each division being constructed in the usual manner, and free to allow the cakes or pans to be withdrawn by hand. I find that it is not advisable to dispense with the subdivisions, as were this done the cakes or pans of color adjoining each other would be most apt to have the color smeared on the adjoining pan or cake; but where I employ the said springs and dispense with the subdivisions I still retain in combination therewith the lateral partitions or subdivisions C C, before described.

Figs. 7 to 12 show springs applied to the pans themselves, Figs. 7 and 8 showing a half-pan with a spring at one end, Figs. 9 and 10 a whole pan with a spring at one side, and Figs. 11 and 12 a whole pan with a spring at one end; but it is to be understood that there may be more than one spring, if desired, and that they may be on one or more of the ends or sides of the pans. Fig. 13 shows a part of a color-box containing the pans provided with springs. Those at A are like those shown in Figs. 7 and 8, that at B is like that shown in Figs. 9 and 10, and that at C is like that shown in Figs. 11 and 12. The springs may or may not project above the divisions, so that the said springs can be pressed inward by hand. The pans may be of any suitable shape or material.

The adaptation of my said improvements may be to the usual type of such boxes, according to the desired requirements of the artist, and I therefore do not limit myself to the precise form of box shown in the drawings.

I claim—

The combination, with the compartments or divisions of a color-box and the pans or cakes contained therein, of pan or cake retaining springs, under the arrangement substantially as hereinbefore described, and illustrated in the accompanying drawings.

In testimony whereof I have signed my name to this specification in the presence of two subscribing witnesses.

CHARLES DAVIS.

Witnesses:
JOSEPH WEBB CORDELL,
2 Hilton Road, Holloway, N.
HERBERT MAY TRICKETT,
7 Richmond Gardens, Shepherd's Bush, W.